July 19, 1938.  W. D. COCKRELL  2,124,410
RELAY APPARATUS
Filed Aug. 30, 1935
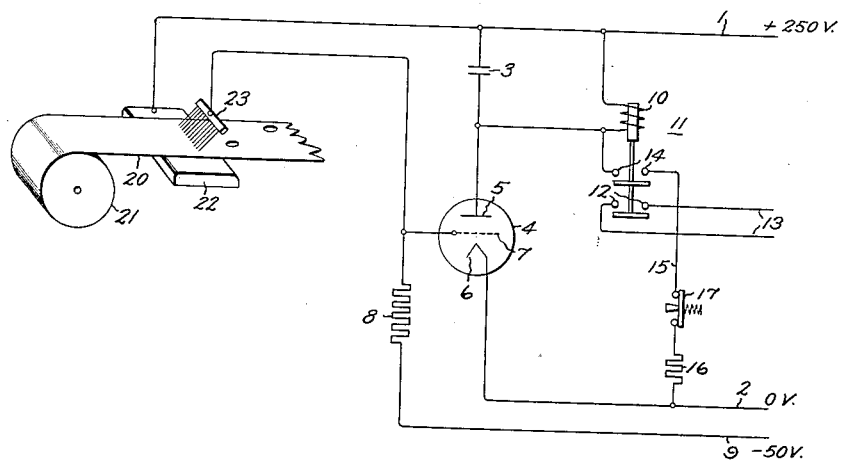
Inventor:
William D. Cockrell,
by Harry E. Dunham
His Attorney.

Patented July 19, 1938

2,124,410

UNITED STATES PATENT OFFICE 2,124,410

RELAY APPARATUS

William D. Cockrell, Schenectady, N. Y., assignor to General Electric Company, a corporation of New York Application August 30, 1935, Serial No. 38,558

5 Claims. (Cl. 175—320)

My invention relates to relay apparatus. It is sometimes desirable to employ a relay to close a circuit in response to an impulse of very short duration, so short that the relay because of its time constant does not become sufficiently energized to operate. It is the object of my invention to provide an improved apparatus of this character whereby such a relay will operate in the desired manner in response to an impulse whose duration is too short otherwise to cause the relay to function.

In accordance with my invention I employ a capacitor and a device which will respond to a very brief electric impulse for closing a circuit between the capacitor and a source of direct current from which the capacitor receives a charge. The relay which normally is too slow to respond to such a brief impulse is connected across the capacitor whereby it is energized by the charge on the capacitor.

My invention will be better understood from the following description taken in connection with the accompanying drawing, and its scope will be pointed out in the appended claims.

Referring to the drawing the single figure of which is a circuit diagram illustrating my invention, lines 1 and 2 represent a source of direct current supply of which line 1 may be at +250 volts with respect to line 2. Connected between lines 1 and 2 is the capacitor 3 which, for example, may have a capacitance of the order of 10 microfarads and in series with this capacitor is the electron discharge device or valve 4 which is shown having the anode 5, the cathode 6 and the control grid 7. This device 4 is preferably a high vacuum device being of the high mutual conductance, high peak current type, through which the flow of current to the capacitor is controlled by the charge on the grid. The latter is normally supplied with a negative biasing potential through a connection including the resistor 8 with a suitable source of negative potential 9, which for example, may be at —50 volts with respect to the cathode. Permanently connected across the capacitor 3 is the winding 10 of the relay 11, which for example, may be a quick acting telephone relay. This relay is shown provided with contacts 12 by which the relay closes the controlled circuit 13 which may connect with any suitable indicating, recording or other device, not shown. Relay 11 also is provided with other contacts 14 which close the holding circuit 15 by which the relay is retained closed after each actuation thereof. This holding circuit is shown including the current limiting resistor 16 and the push button opening switch 17 through which the holding circuit may be manually opened.

With the apparatus as thus described the device or valve 14 normally is non-conducting and there is no charge on capacitor 3. If a very brief positive impulse is applied to the grid 7 the device becomes conducting for the length of that impulse but the time constant of the relay 11 may be too great to permit the relay to function in response to such a short impulse. The capacitor 3, however, receives a charge during the brief impulse and this charge subsequently equalizes through the winding of the relay causing it to become energized sufficiently to operate. Having operated, the relay seals itself closed through the holding circuit and remains closed until released by the push button switch 17.

The above described relay apparatus is adapted to operate in response to sudden impulses from various sources. An example of one such source is represented in the drawing as comprising means for closing a circuit in response to presence of a hole in a paper web or strip. Such a strip is represented at 20 being drawn by the reel 21 over the metal plate 22. Opposite this plate is the metal brush 23 resting against the paper. The plate and brush connect respectively with the line 1 and the grid 7 of device 4, whereby as a hole in the paper passes between the brush and plate a short positive impulse is supplied to the grid. As so represented the complete apparatus is adapted to operate in response to the passage of holes in the paper web and thus serve to detect the presence of such imperfections in the web.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent in the United States is:

1. Relay apparatus operative in response to an impulse comprising a source of direct current supply, a relay, means responsive to said impulse for connecting the relay in circuit with said source for a time limited substantially to the duration of said impulse, said relay being incapable of operating in response to said limited connection and a capacitor connected across said relay for receiving a charge from said source during the connection of the relay to the source and for subsequently discharging through the relay to effect the operation thereof.

2. Relay apparatus operative in response to a momentary electric impulse comprising a source of direct current supply, a relay, means for connecting the relay in circuit with said source for a time limited substantially to the duration of said impulse, said relay having a time constant too great to enable the relay to respond to said limited connection and a capacitor connected across said relay for receiving a charge from said source and subsequently discharging through said relay thereby to operate the same.

3. Relay apparatus operative in response to a momentary electric impulse comprising a source of direct current supply, an electromagnetic relay, a valve for connecting said relay in circuit with said source for a time limited in length substantially to that of said signal, said time being too short to enable the relay to make a response and a capacitor having a relatively large capacitance connected in parallel with said relay whereby the energy stored therein during said limited time subsequently causes the relay to make a response.

4. Relay apparatus operative in response to a momentary electric impulse comprising a source of direct current supply, an electromagnetic relay, a valve connected in series with said relay and source for passing current to the relay for a time limited in length substantially to that of said signal, the time constant of said relay being too great to enable the relay to operate in response to the operation of said valve and a capacitor of relatively large capacitance connected across said relay, said capacitor becoming charged by the operation of said valve and subsequently discharging through said relay and causing an operation thereof.

5. Relay apparatus operative in response to a momentary electric impulse comprising a source of direct current supply, an electromagnetic relay, a grid controlled valve in series with said relay and said source, means for applying said impulse to said grid to cause said valve to pass current to said relay for a time limited substantially to the duration of said impulse, said relay having a time constant too great to enable it to operate in response to the operation of said valve and a capacitor of relatively large capacitance connected across said relay, said capacitor receiving a charge during said impulse and discharging subsequently through said relay to cause the operation thereof.

WILLIAM D. COCKRELL.